Dec. 12, 1939.    C. A. PIPENHAGEN    2,182,878
MEANS FOR DISPENSING AND APPLYING FERTILIZER
Filed Jan. 28, 1938    2 Sheets-Sheet 1
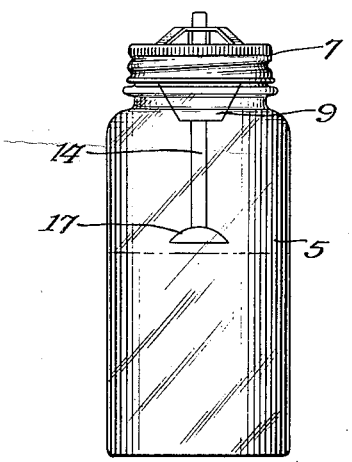
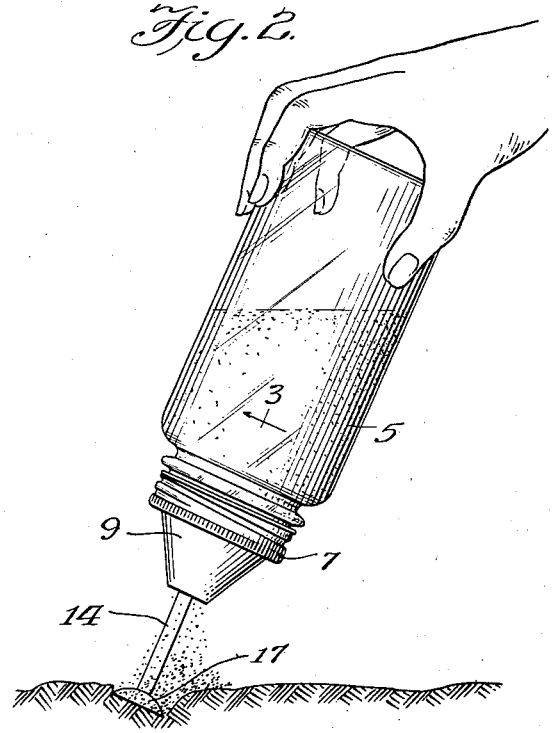
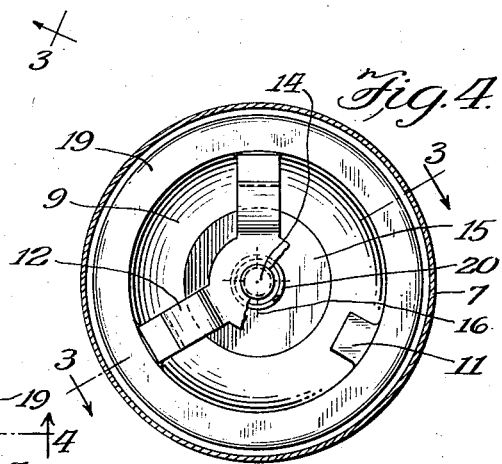
Inventor
Charles A. Pipenhagen
By Williams, Bradbury,
McCaleb & Hinkle Attys.

Dec. 12, 1939.  C. A. PIPENHAGEN  2,182,878
MEANS FOR DISPENSING AND APPLYING FERTILIZER
Filed Jan. 28, 1938  2 Sheets-Sheet 2

Inventor:
Charles A. Pipenhagen
By
Williams, Bradbury, McCaleb & Hinkle
Attys

Patented Dec. 12, 1939

2,182,878

UNITED STATES PATENT OFFICE 2,182,878

MEANS FOR DISPENSING AND APPLYING FERTILIZER

Charles A. Pipenhagen, Chicago, Ill.

Application January 28, 1938, Serial No. 187,372

3 Claims. (Cl. 221—62)

My invention contemplates and provides a device of simple and sturdy construction, capable of being held and manipulated with one hand, for dispensing and applying fertilizer to soil at and adjacent to the roots of growing plants.

Prepared fertilizers of the kind commonly called "chemical fertilizers", are usually granular materials which tend to cake upon contacting moisture, and contain compounds, usually acid, which tend to burn or otherwise injure the skin. These and other disadvantages result when the fertilizer is distributed and applied by methods heretofore used, i. e., by the use of implements such as trowels or spades.

It is a salient feature of my invention to provide a device for dispensing and applying fertilizer wherein the fertilizer is at all times contained in a unitary structure, free from possible moisture-absorption or contact with the hands of a user.

A further object of my invention is the provision of a device for dispensing and applying fertilizer which easily may be converted into a compact sealed container wherein to merchandise or store fertilizer.

Another object of my invention is the provision of a device of the kind described, wherein the means for dispensing the fertilizer, and the means for applying it to the soil, are provided by a single unitary structure which may be applied to a Mason jar or other suitable receptacle.

Another object of my invention is to provide a device for dispensing and applying at will a predetermined quantity of fertilizer.

Other features, objects and advantages of the invention will be apparent from the following detailed description and from the accompanying drawings, wherein similar characters refer to similar parts throughout the several views, and wherein:

Figure 1 is a side elevational view of the device of the present invention, showing the device as it appears when closed and not in use;

Figure 2 is a side elevational view of the device as used to dispense and apply fertilizer;

Figure 3 is a fragmentary vertical sectional view, taken on the lines 3—3 of Figs. 2 and 4, looking in the direction of the arrows;

Figure 4 is a horizontal sectional view, partly broken away, taken substantially on the line 4—4 of Fig. 3 and looking in the direction indicated by the arrows;

Figure 5:
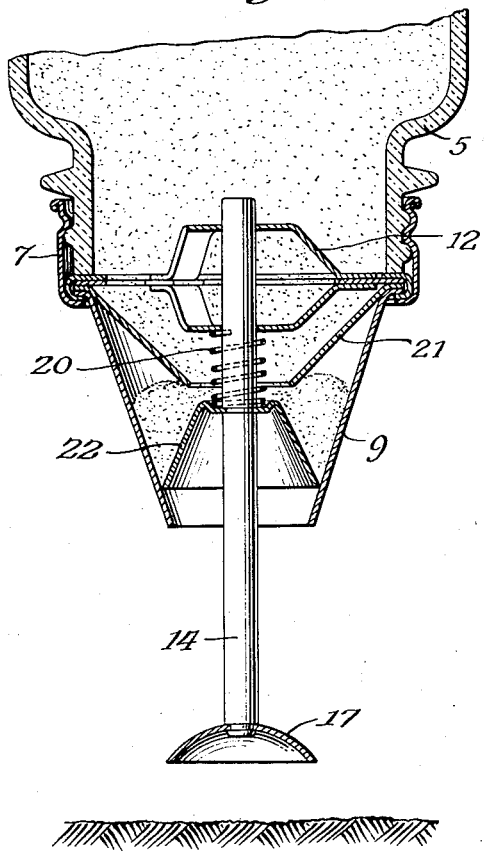
Figures 5 and 6 are fragmentary vertical sectional views showing a modified form of my device.

The device preferably comprises a Mason jar or other glass container 5, provided at its top with threads 6 for receiving cap 7. The top of cap 7 is cut away, as at 8, a spaced distance inwardly from its rim, to provide a circular opening for receiving the cone or funnel 9.

The dispensing unit consists of a flat metal ring 10 of the same diameter as the top of the container 5, with ears 11 extending radially inwardly thereof, providing mountings for the spider 12. The upper and lower bridges of the spider 12 are welded or otherwise suitably secured to the ears 11, and together form a spider having double bearing supports for carrying the shaft 14.

Mounted on the shaft 14, a substantial distance inwardly from the small end of funnel 9, is a valve disc 15. Valve disc 15 conveniently is mounted on the shaft 14 by circumferentially channeling the shaft 14 where the valve disc is to be mounted, drilling a hole in the valve disc of the same diameter as that of the shaft 14 at the channel, radially slitting the valve disc outwardly from the hole, as at 16, then forcing the disc over the shaft, causing the leaves in the disc made by the slits to raise, and finally press-fitting the leaves into the channel of shaft 14 (Fig. 3).

Carried on the end of the shaft 14, opposite the spider 12, is a ground-engaging or applicator disc 17, which is drilled to fit over the reduced end of shaft 14, the end of shaft 14 being then peened over at 18 (Fig. 2) firmly to hold the disc 17 thereon. The applicator disc is preferably slightly bell shaped, as shown.

The base of funnel 9 is bent outwardly, providing a seat which rests on ring 10, and the funnel 9 is securely held against ring 10 by means of the circular cap ring 19, which is crimped about the base of funnel 9 and ring 10, as shown most clearly in Fig. 3.

A compression spring 20 is mounted on shaft 14, seating at one end on the upper spider bridge 12 and at the other end on valve disc 15, forcing the valve disc 15 to seat against the inside of funnel 9. The valve disc 15 is of such size that it will be forced to seat a substantial distance inwardly from the small end of funnel 9.

In operation the device is used as shown in Fig. 2, where the fertilizer is dispensed and applied in a single simple operation. In this position, as the applicator disc 17 is applied to the soil and pressure is exerted by the operator on the container 5, the shaft 14 will move in the bearings 13 against the pressure of the spring 20 bearing against valve disc 15. The valve will be forced open, permitting fertilizer lying in the funnel 9 above the valve disc 15 to be dispensed. The fertilizer will fall on and about the applicator disc 17 which, guided by the operator's hand on the container 5, will be applied to the soil, where and as desired. In the use of the device, the operator's hands never contact the fertilizer, and consequent burns and injuries to his skin are thus avoided. Because the valve disc 15 contacts the funnel 9 a substantial distance from the small end of the funnel, any moisture that might adhere to the funnel 9 will not gain entrance to the inner regions of the container and cake the fertilizer. Also, because the shaft 14 is mounted on the double bearing spider 12, the shaft 14 will be maintained a spaced distance radially from the rim of the small end of the funnel 9, and the valve will work smoothly, and sticking will be eliminated.

It will be seen that shaft 14, valve disc 15, applicator disc 17, spider 12, spring 20 and funnel 9 are securely held in a simple unitary structure. By unscrewing the cap and reversing the unit so that the shaft 14 extends into the container 5, a compact closed device is obtained, permitting ready merchandising and ease in storing, while maintaining the fertilizer in dry, sealed condition.

Figure 6:
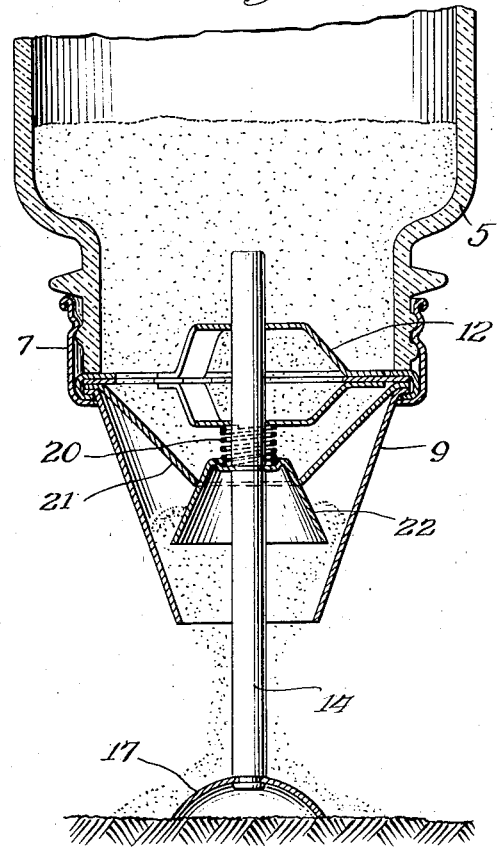
Figure 7:
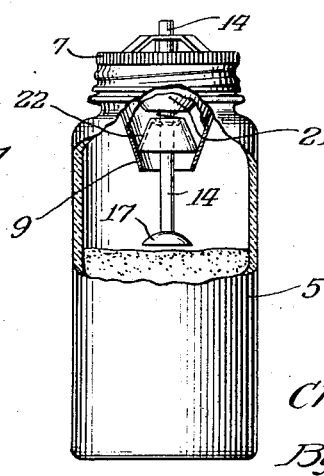
Figure 7 is a side elevational view of the modified device shown in Figures 5 and 6, and partly broken away to show the device as assembled in closed condition for storage or merchandising.

In Figs. 5, 6 and 7 I have shown a modified form of dispensing mechanism as applied to my device, which permits only a measured quantity of fertilizer to be dispensed, at the will of the operator.

Mounted within the funnel or cone 9 is an inner funnel or cone 21 secured at its base to the spider unit in the same manner as the funnel 9 is secured thereto, as previously described. Mounted on the shaft 14 is a bell-shaped valve member 22, the top of which provides a seat for compression spring 20. The opening in the inner funnel 21 is sufficient to accommodate the upper portion of the valve member 22.

In operation, when the applicator disc engages the soil and the shaft 14 moves back in the spider bearings, the valve member 22 is moved from the position in Fig. 5 to position in Fig. 6, permitting the fertilizer contained in the chamber between the inner and outer funnels to be dispensed. The valve member 22 then engages the inner funnel 21, closing the opening in said inner funnel and stopping the flow of fertilizer.

Thus it will be see that I have provided a device for measuring a predetermined quantity of fertilizer. When the valve member is in position to close the opening of the inner funnel, the soil may be worked without fear of too great a discharge of the fertilizer though the outer valve is open. When the compression spring 20 forces the valve member 22 to close the outer valve at the funnel 9, the valve member 22 will open the inner valve and fertilizer will discharge into the measuring chamber for another dispensing operation.

It will be understood that my invention may assume other specific forms without departing from the spirit and scope of my invention.

What I claim as new and desire to secure by Letters Patent of the United States is:

1. A device of the class described, comprising a fertilizer container, a spring-pressed dispensing valve, a shaft carrying said valve, a funnel housing the shaft and the valve in a unitary assembly, and releasable securing means for holding said unitary assembly in sealed engagement on said container in operable or in inoperable position.

2. A device for dispensing and applying fertilizer, comprising a container, a unitary assembly carried by said container including an outer funnel, an inner funnel within the outer funnel, a valve element carried by a shaft extending through both said funnels, said valve element normally closing said outer funnel and operable by the shaft to open the outer funnel and close the inner funnel, and releasable securing means for holding said unitary assembly in sealed engagement on said container in operable or in inoperable position.

3. A device of the class described, comprising a fertilizer container, a spring-pressed dispensing valve, an applicator element, a common shaft carrying said valve and applicator element, a funnel through which the fertilizer is dispensed and through which the shaft operates, means in said funnel for carrying said shaft in spaced relation to the sides of said funnel, said funnel housing the shaft and valve in a unitary assembly, and releasable securing means for holding said unitary assembly in sealed engagement on said container in operable or inoperable position.

CHARLES A. PIPENHAGEN.